United States Patent
Geyer et al.

(10) Patent No.: US 6,868,829 B1
(45) Date of Patent: Mar. 22, 2005

(54) MAXIMUM SPEED LIMITATION FOR A TWO-CYCLE ENGINE

(75) Inventors: Klaus Geyer, Sulzbach (DE); Heiko Rosskamp, Adelberg (DE)

(73) Assignee: Andreas Stihl AG & Co. KG (DE)

( * ) Notice: Subject to any disclaimer, the term of this patent is extended or adjusted under 35 U.S.C. 154(b) by 3 days.

(21) Appl. No.: 10/625,374

(22) Filed: Jul. 23, 2003

(30) Foreign Application Priority Data

Jul. 24, 2002 (DE) .......................................... 102 33 586

(51) Int. Cl.$^7$ ................................................. F02P 5/00
(52) U.S. Cl. ............................. 123/406.11; 123/406.23
(58) Field of Search .......................... 123/65 R, 406.11, 123/406.19, 406.23, 406.24, 406.18

(56) References Cited

U.S. PATENT DOCUMENTS 5,477,131 A * 12/1995 Gegner ........................ 323/222
6,308,690 B1 * 10/2001 Sturman ..................... 123/508

FOREIGN PATENT DOCUMENTS

DE  43 26 010  7/1997

* cited by examiner

Primary Examiner—Bibhu Mohanty
(74) Attorney, Agent, or Firm—Robert W Becker & Associates; Robert W. Becker

(57) ABSTRACT

A method of limiting the maximum speed of a two-cycle engine in a manually-guided implement such as a hedge trimmer is provided. Via a unit for controlling the ignition time point in a crankshaft angular range prior to the upper dead center position of a reciprocating piston, the ignition is interfered with above an operational speed to keep the speed below the maximum speed. To ensure a rapid onset of the speed regulation along with good exhaust gas values, in the range between the operational speed and the maximum speed, the ignition time point is shifted in the direction toward the upper dead center position of the piston in such a way that in the vicinity of the maximum speed, the ignition time point is close to the upper dead center position of the piston and the engine output is reduced to a prescribed value that corresponds approximately to the frictional horsepower for the driving of the tool.

12 Claims, 1 Drawing Sheet

MAXIMUM SPEED LIMITATION FOR A TWO-CYCLE ENGINE

BACKGROUND OF THE INVENTION

The present invention relates to a method of limiting the maximum speed of an internal combustion engine, especially of a two-cycle engine in a manually-guided implement such as a hedge trimmer, a power chain saw, a brush cutter or the like.

Methods for limiting the maximum speed of an internal combustion engine in a manually-guided implement are known. For example, U.S. Pat. No. 5,447,131 discloses an ignition time control via which the maximum speed of the internal combustion engine can be limited to a prescribed value. The control of the speed is undertaken in such a way that the ignition is suppressed for one or more crankshaft rotations. At the same time, a possibility is proposed for permitting an overspeed for a limited period of time in order to satisfy extreme operating requirements. Even if two-cycle engines having such ignition control devices are designed for low exhaust gas values, the measures to be taken for acceptable exhaust gas values in the speed regulation range are considerable.

It is therefore an object of the present invention to provide a method for controlling the maximum speed of an internal combustion engine in a manually-guided or portable implement, which at high speed stability and good operation is largely neutral relative to exhaust gas.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

Figure 1:
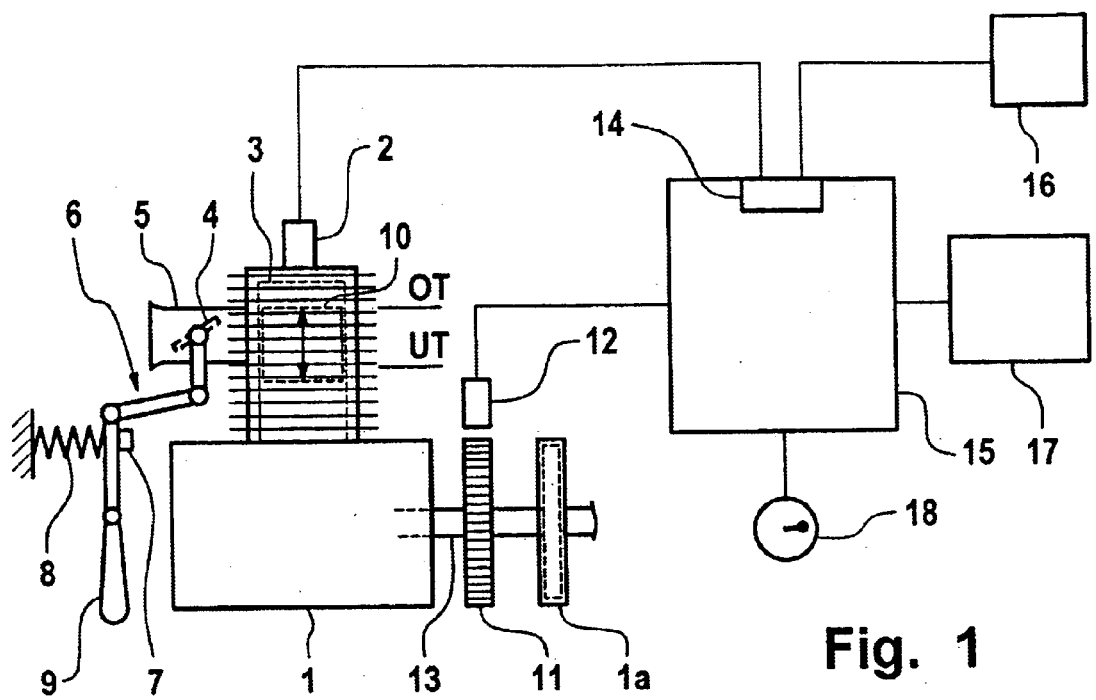
FIG. 1 is an operational diagram of an ignition control circuit of a two-cycle engine for carrying out the inventive method.

The method of the present invention for limiting the maximum speed of an internal combustion engine includes the steps of providing a unit for controlling an ignition time point in a crankshaft angle range prior to an upper dead center position of a reciprocating piston of the internal combustion engine, wherein above an operational speed ignition is interfered with to keep the speed below a maximum speed; and in a range between the operational speed and the maximum speed, the ignition time point is shifted in the direction toward the upper dead center position of the piston in such a way that in the vicinity of the maximum speed, the ignition time point is close to the upper dead center position and engine output is reduced to a prescribed value that corresponds approximately to a frictional horsepower for the driving of the tool.

The main concept of the present invention is that by shifting the ignition time point the engine output is significantly reduced in such a way that due to the friction horsepower necessary for the operation of the tool, the speed remains approximately constant or drops slightly. The ignition time point in the range of the speed regulation is selected such that the engine output that is available is just sufficient to overcome the friction horsepower of the drive line and to drive, for example to rotate, the tool.

Thus, for example, a hedge trimmer, to overcome the friction horsepower in the gear mechanism of the trimmer, requires a minimum output to be able to move the trimmer blade at all. This friction horsepower that is necessary to move the trimmer blades corresponds to the engine output that is still made available by the engine ignition time point shifted in the direction toward the upper dead center position.

The regulation of the engine speed by extreme ignition time point shifting has the advantage that despite the speed regulation, in every cycle a combustion in the combustion chamber is ensured. In contrast to speed limitation by ignition suppression, with the inventive limitation significantly improved exhaust gas values are possible in the speed regulation range. As a result, the exhaust gas and noise burden upon the operator is also reduced. In addition, due to the improved exhaust gas properties, the peak load of a catalytic converter that is advantageously disposed in the exhaust gas path is also less.

The extreme shifting of the ignition time point for limiting the maximum speed also leads to a more harmonic sound pattern of the induced noises, since due to more uniform peak pressures in the cylinder, the vibrational inducement is reduced.

In contrast to a speed regulation via ignition suppression, significantly lower peak pressures occur in the cylinder, so that also the crank drive is subjected to less stress.

It should also be noted that the inventive regulation of the speed can also be utilized with modern engines having air scavenging, stratified charging, or other techniques for introducing mixture into the combustion chamber without adversely affecting the charge change. Thus, the CWI engine described in WO 00/11334 requires the exhaust gas pressure for the mixture introduction into the combustion chamber. Since with the inventive speed regulation a combustion takes place in every cycle, also in the case of speed regulation an adequate exhaust gas pressure is available for the introduction of mixture.

Since the drive capacity of the internal combustion engine, in the range of the ignition time point of approximately 10° prior to upper dead center position to upper dead center position, reacts in a pronounced manner to the change of the ignition time point, the ignition time point curve between the operational speed and the maximum speed is advantageously non-linear.

To capture dynamic effects during run-up or acceleration of the internal combustion engine in the regulation range, the ignition time point that is set in the vicinity of the maximum speed, and is in the vicinity of the upper dead center position, is expediently maintained essentially unchanged for a prescribed speed range above the maximum speed. This speed range advantageously includes a speed range of zero to about 1,000 rpm.

The system enables a slight interval between the speed when the system becomes effective and the speed regulation. A range of about 150 to 1500 rpm, preferably about 500 rpm, achieves a good effect. Due to this narrow speed range, the ignition time point characteristic curve is extremely steep, which on the one hand leads to a rapid drop of the engine output after exceeding the speed at which the system becomes effective, and on the other hand, with renewed use of the tool, ensures a rapid return to the output-optimized characteristic curve branch. Thus, the ignition time point between the operational speed and the speed regulation is shifted by about 20 to 35° crankshaft angle, preferably about 30° crankshaft angle, in the direction toward the upper dead center position of the piston.

Further specific features of the present invention will be described in detail subsequently.

DESCRIPTION OF PREFERRED EMBODIMENTS

Referring now to the drawings in detail, the ignition control circuit schematically illustrated in FIG. 1 is provided on an internal combustion engine 1, which can be embodied as a scavenging engine, a stratified charge engine, a CWI engine pursuant to WO 00/11334, or the like. Such an internal combustion engine 1 can be used as a drive engine in a manually-guided implement such as a hedge trimmer, a power chain saw, a brush cutter, or the like. In the illustrated embodiment, the internal combustion engine 1, is, in particular, an air-cooled two-cycle engine and, via a centrifugal clutch 1a, drives a non-illustrated implement.

The internal combustion engine 1 has an intake connector 5 in which is disposed a carburetor and a butterfly valve 4, which can be actuated via a linkage 6 from a gas or throttle lever 9 in order to change the engine speed. In the illustrated idling position, the throttle lever 9 rests against an abutment 7 under the effect of a spring 8.

Disposed in the cylinder 3 of the internal combustion engine 1 is a reciprocating piston 10 that, via a non-illustrated connecting rod, drives a crankshaft 13. The piston 10 has an upper reversal point OT, which is also designated as the upper dead center position; similarly, the lower reversal point UT is designated as the lower dead center position. The crankshaft 13 rotates exactly one time when the piston 10 travels from the upper dead center position OT to the lower dead center position UT and back to the upper dead center position OT. Rotating with the crankshaft 13 of the internal combustion engine 1 is a pulse transmitter wheel 11, marks of which provided on the outer periphery thereof generate, in an associated rotational speed or rpm sensor 12, pulses that are conveyed as speed information signals to a unit 15 for controlling the ignition time point. The marks on the pulse transmitter wheel 11 are expediently disposed in such a way that for each crankshaft rotation, at least one signal that is specific to the crankshaft position is generated in the rpm sensor 12, from which the unit 15 can recognize the actual position of the crankshaft 13. Thus, the marks can be disposed at various spacings about the periphery of the pulse transmitter wheel 11, so that from the spacing of the pulses, the angular position of the crankshaft can be determined at the output of the rpm sensor 12.

Advantageously, to determine the actual rpm or rotational speed n of the internal combustion engine 1, merely those pulse signals are evaluated that are delivered from the sensor 12 over the crankshaft periphery in the range of 45° crankshaft angle prior to the lower dead center position UT to 45° crankshaft angle after the lower dead center position UT. In this way, the delay that occurs due to the compression, and the acceleration of the rotational speed that occurs due to ignition, can be defined or masked out.

The unit 15, which is embodied as an electronic circuit arrangement, preferably has a microprocessor that processes the signals of the rpm sensor 12 and in conformity therewith controls a switch 14, especially a transistor or a thyristor, to supply to a spark plug 2, which is disposed in the cylinder 3 of the internal combustion engine 1, the energy required to produce an ignition spark that is to be generated in the combustion chamber of the cylinder; the energy is made available from a voltage source 16.

Figure 2:
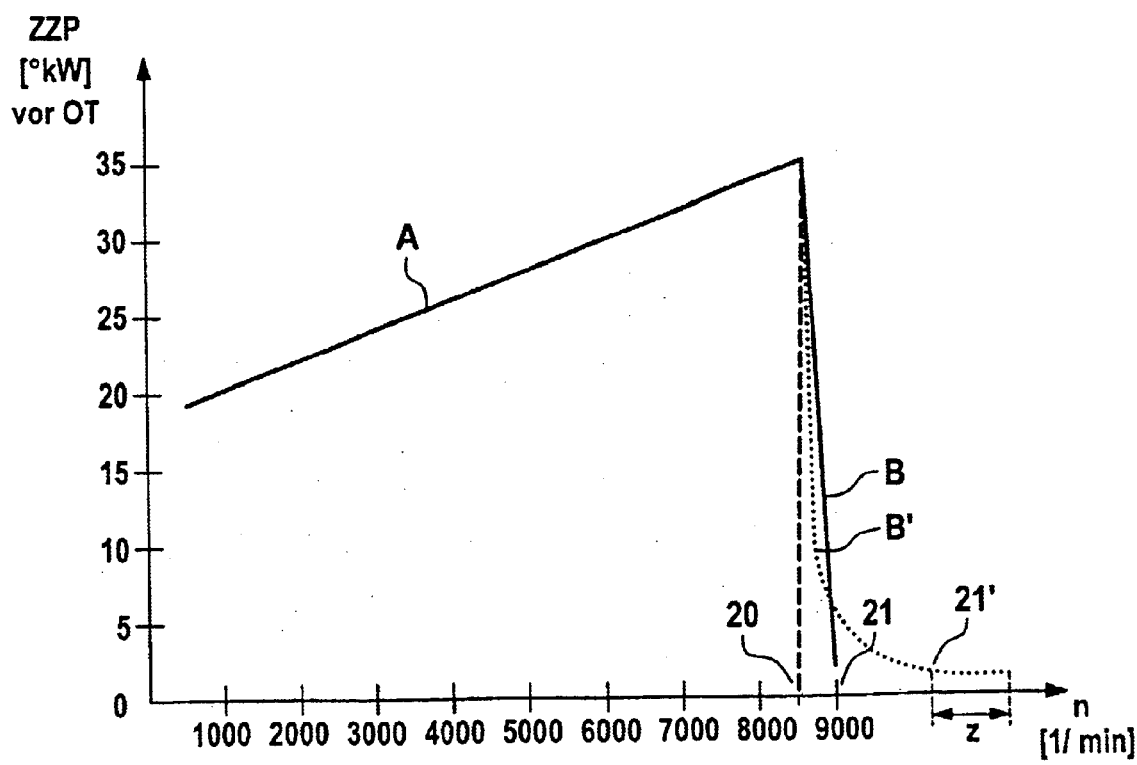
FIG. 2 is a graph of the ignition time point in degrees of crankshaft angle prior to upper dead center position plotted against the rpm or rotational speed.

The microprocessor is in communication with a memory 17 in which is stored in particular the curve of the ignition time point plotted against the rpm or rotational speed n as illustrated in FIG. 2. Further values or parameters can be stored in the memory 17 that, for certain operating phases of the internal combustion engine, are necessary during the calculation of an ignition time point.

As can be readily seen from FIG. 2, the first branch A of the ignition time point curve is designed such that as the rpm n increases, the ignition time point is shifted continuously earlier. In the illustrated embodiment, at approximately 1,000 rpm, the ignition time point is at approximately 20° crankshaft angle prior to the upper dead center position. As the rpm n increases up to the rotational speed indicated by the reference numeral 20, which is approximately 8,500 rpm, the ignition time point is shifted continuously earlier, i.e. from 20° crankshaft angle prior to upper dead center position at 1,000 rpm, to about 35° crankshaft angle prior to upper dead center position at 8,500 rpm. Other slopes of the ignition time point curve in branch A can be expedient; a shifting zone of about 300 crankshaft angle is advantageous.

Above the rotational speed 20, which can also be designated as the operational speed 20, is the maximum speed 21, which in the illustrated embodiment can, for example, be provided at approximately 9,000 rpm. In this small speed range of about 500 rpm, the ignition time point curve drops very sharply in conformity with the characteristic curve B, whereby a narrow rotational speed tolerance results. In the illustrated embodiment, the ignition time point is shifted from about 35° crankshaft angle prior to upper dead center position at 8,500 rpm to about 50 crankshaft angle prior to upper dead center position at 9,000 rpm. In this connection, in the vicinity of the maximum speed 21 the ignition time point is selected such that the output of the internal combustion engine 1 is lowered to a prescribed magnitude that corresponds approximately to the friction horsepower for driving the tool that is driven by the internal combustion engine.

The speed 20 (engagement or operational speed) is selected as a function of the configuration of the ignition system and/or of the ignition time point curve. The operational speed 20 is advantageously in the vicinity of the speed at which the amount of the difference of the actual ignition time point (° prior to upper dead center position) minus the ignition time point of the maximum output (° prior to upper dead center position) for the first time is greater than 10° crankshaft angle. For the definition of the operational speed, it is also possible to use the quotient of the change of the ignition time point in degrees crankshaft angle divided by the change of the speed in rpm. If this quotient for the first time becomes greater than 5°/100 rpm, the operational speed lies in this region according to the definition.

The ignition time point curve pursuant to the steep characteristic curve B has the following effect:

If the internal combustion engine at full throttle and without load exceeds the operational speed 20, the ignition time point shifting becomes effective and shifts the ignition time point to a few degrees crank angle prior to upper dead center position. As a result, the output of the internal combustion engine drops significantly so that the friction horsepower that is to be overcome to drive the tool is in equilibrium to the output of the internal combustion engine. The speed of the internal combustion engine is adjusted to the maximum speed of, in the illustrated embodiment, 9,000 rpm.

If, as a result of work that is to be undertaken, the tool is slowed down at the workpiece, the speed of the internal combustion engine drops, which is detected by the unit 15 for controlling the ignition time point via the rpm sensor 12. The ignition time point is immediately shifted in the earlier direction. Due to the steepness of the characteristic curve branch B or B', the internal combustion engine 1 is rapidly again in the output range having an ignition time point of about 35° crankshaft angle prior to upper dead center position, so that one can immediately work with the tool.

Since the output of the internal combustion engine 1 in the range of the ignition time point 10° prior to upper dead center position to upper dead center position reacts in a pronounced manner to a change of the ignition time point, instead of the steep, approximately linear curve B of FIG. 2, a non-linear characteristic curve B' is advantageous, as indicated by the dotted line in FIG. 2. To capture dynamic effects, pursuant to this characteristic curve B', an overspeed or excess rpm is possible beyond a maximum speed 21'. In this connection, the ignition time point set in the vicinity of the maximum speed 21', and disposed in the vicinity of the upper dead center OT, is kept essentially unchanged in the range of the overspeed, in other words, for a speed range z above the maximum speed 21'. The speed range z advantageously includes a speed range of zero to about 1,000 rpm.

The inventive method has the advantage that even in the range of the regulation of the speed of the internal combustion engine, the exhaust gas values are significantly better that with the heretofore known methods. Due to the straightforward construction, it is possible to manually shift the ignition time point curve via the switch 18, a keying device or the like, so that for example the characteristic curve B can be shifted to the left by, for example, 1,500 rpm. As a result the operational speed 20 is lowered, for example, by 1,500 rpm to 7,000 rpm, and preferably also the maximum speed is correspondingly dropped to 7,500 rpm. In this switching position, the internal combustion engine can, for example, be operated in noise-sensitive areas. It is also advantageous to change over via the switch 18 to an ignition time point curve that on the whole is set to a low development of noise. Instead of a switch 18, it is also possible to provide a regulator or an infinitely variable adjustment or shifting.

The specification incorporates by reference the disclosure of German priority document 102 33 586.9 filed 24 Jul. 2002.

The present invention is, of course, in no way restricted to the specific disclosure of the specification and drawing, but also encompasses any modifications within the scope of the appended claims.

We claim:

1. A method of limiting the maximum speed of an internal combustion engine that drives a tool, including the steps of:

providing a unit for controlling an ignition time point in a crankshaft angle range prior to an upper dead center position of a reciprocating piston of the internal combustion engine, wherein above an operational speed, ignition is interfered with to keep the speed below a maximum speed; and in a range between the operational speed and the maximum speed, shifting the ignition time point in a direction towards the upper dead center position of the piston in such a way that in the vicinity of the maximum speed, the ignition time point is close to the upper dead center position and engine output is reduced to a prescribed value that corresponds approximately to a frictional horsepower for the driving of the tool.

2. A method according to claim 1, wherein an ignition time point curve is provided that is non-linear.

3. A method according to claim 1, wherein an ignition time point that is set in the vicinity of the maximum speed and is in the vicinity of the upper dead center position, is kept essentially unchanged for a speed range that is above the maximum speed.

4. A method according to claim 3, wherein the speed range ranges from zero to about 1000 rpm.

5. A method according to claim 1, wherein said operational speed is in a speed range in which a quotient of a change of the ignition time point in degrees crankshaft angle divided by a change of the speed in rpm is greater than 0.05.

6. A method according to claim 1, wherein a speed range between the operational speed and the maximum speed is about 150 to 1500 rpm.

7. A method according to claim 6, wherein the speed range is about 500 rpm.

8. A method according to claim 1, wherein the ignition time point between the operational speed and the maximum speed is shifted by about 20 to 35° crankshaft angle in the direction toward the upper dead center position of the piston.

9. A method according to claim 8, wherein the ignition time point is shifted by about 30° crankshaft angle.

10. A method according to claim 1, wherein the crankshaft angle near the maximum speed is about 5° prior to the upper dead center position.

11. A method according to claim 1, wherein the engine is a scavenging engine having a preferably layered scavenging, or is an engine having a different pronounced stratified charge technology.

12. A method according to claim 1, wherein an ignition time point curve is switchable by a user in such a way that after switching, the operational speed, and preferably also the maximum speed, are lowered.

* * * * *